(12) United States Patent
Hartwich (10) Patent No.: US 8,824,493 B2
(45) Date of Patent: Sep. 2, 2014

(54) MEDIA ACCESS CONTROL METHOD FOR A BUS SYSTEM AND COMMUNICATION DEVICE

(75) Inventor: Florian Hartwich, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 263 days.

(21) Appl. No.: 13/377,886

(22) PCT Filed: Jun. 9, 2010

(86) PCT No.: PCT/EP2010/058098
§ 371 (c)(1),
(2), (4) Date: Apr. 3, 2012

(87) PCT Pub. No.: WO2010/145980
PCT Pub. Date: Dec. 23, 2010

(65) Prior Publication Data
US 2012/0189021 A1 Jul. 26, 2012

(30) Foreign Application Priority Data

Jun. 16, 2009 (DE) .......................... 10 2009 026 965

(51) Int. Cl.
*H04L 12/40* (2006.01)
*H04L 12/413* (2006.01)

(52) U.S. Cl.
CPC .......... *H04L 12/413* (2013.01); *H04L 12/4135* (2013.01)
USPC ........................................ 370/438; 370/462

(58) Field of Classification Search
USPC .................................................. 370/438, 462
See application file for complete search history.

(56) References Cited

U.S. PATENT DOCUMENTS

| 5,600,782 A | * | 2/1997 | Thomson | 714/4.21 |
| 5,724,370 A | * | 3/1998 | Sferrazza et al. | 714/807 |
| 5,895,483 A | * | 4/1999 | Mori | 711/114 |
| 2009/0085605 A1 | * | 4/2009 | Zheng et al. | 326/37 |

FOREIGN PATENT DOCUMENTS

| DE | 100 00 305 | 7/2001 |
| DE | 103 01 637 | 7/2004 |
| WO | 2004/105278 | 12/2004 |
| WO | 2005/081463 | 9/2005 |

* cited by examiner

*Primary Examiner* — Hassan Kizou
*Assistant Examiner* — Ashil Farahmand
(74) *Attorney, Agent, or Firm* — Kenyon & Kenyon LLP

(57) ABSTRACT

A media access control method is described for controlling access by one user station of a bus system to a first channel of the bus system utilized jointly by a plurality of user stations, where in the case of the method, at least one enable interval is specified for the user station, within which the user station has exclusive access to the first channel. In order to specify a media access control method in which large volumes of data may be transmitted relatively quickly and real-time conditions can be honored during the transmission of messages via the bus system, access to a second channel is utilized by a plurality of user stations is controlled using the method, the second channel being enabled for access by the user station only within the enable interval.

18 Claims, 5 Drawing Sheets

MEDIA ACCESS CONTROL METHOD FOR A BUS SYSTEM AND COMMUNICATION DEVICE

FIELD OF THE INVENTION

The present invention relates to a media access control method for controlling access by one user station of a bus system to a first channel of the bus system utilized jointly by a plurality of user stations, where in the case of the method, at least one enable interval is predefined for the user station, within which the user station has exclusive access to the first channel. In addition, the present invention relates to a user station and a control element, particularly a CAN controller, which are set up to implement such a method.

BACKGROUND INFORMATION

For example, Laid Open German Patent document DE 100 00 305 A1 discusses the "Controller Area Network" (CAN), as well as an extension of the CAN known as the "Time Triggered CAN" (TTCAN). The media access control method used in the CAN is based on a bit-by-bit arbitration. During the bit-by-bit arbitration, a plurality of user stations may transmit data via the channel of the bus system simultaneously, without the data transmission thereby being disturbed. Furthermore, upon transmitting one bit via the channel, the user stations are able to ascertain the logic state (0 or 1) of the channel. If a value of the transmitted bit does not correspond to the ascertained logic state of the channel, the user station then terminates the access to the channel. In the case of the CAN, the bit-by-bit arbitration is usually carried out in an arbitration field within a data frame to be transmitted via the channel. After a user station has sent the arbitration field completely to the channel, it knows that it has exclusive access to the channel. Thus, the end of the transmission of the arbitration field corresponds to a beginning of an enable interval, within which the user station may use the channel exclusively. According to the protocol specification of the CAN, other user stations are not allowed to access the channel, that is, transmit data to the channel, until the transmitting user station has transmitted a checksum field (CRC field) of the data frame. Thus, a final instant of the transmission of the CRC field corresponds to an end of the enable interval.

A non-destructive transmission of the data frame via the channel is achieved owing to the bit-by-bit arbitration. Good real-time properties of the CAN are thereby obtained, whereas media access control methods, in which the data frame transmitted by one user station may be destroyed during the transmission via the channel because of a collision with a further data frame transmitted by another station, have a markedly poorer real-time behavior, since the data transmission is delayed because of the collision and the new transmission of the data frame thereby required.

A further improvement in the real-time behavior of the CAN is achieved by the TTCAN extension. According to the protocol specification of the TTCAN, a time-window structure is defined which includes a plurality of consecutive time windows (often also known as time slots) and which repeats regularly. In this case, a specific type of message, and therefore a specific user station, may be assigned a specific time window, within which messages of this message type are allowed to be transmitted. Therefore, in the case of the TTCAN, specific time windows are provided, within which one specific station has exclusive access to the channel of a CAN domain. When working with a TTCAN, the access to the channel is coordinated at least partially according to the principle of Time Division Multiple Access (TDMA).

The protocols of the CAN and of its TTCAN extension are especially suitable for transmitting short messages under real-time conditions. However, if larger data blocks are to be transmitted via a CAN domain, the relatively low bit rate then makes itself felt in an annoying manner. In order to ensure the correct functioning of the bit-by-bit arbitration, for the transmission of one bit, it is necessary to honor a minimum duration which, in particular, is a function of the expanse of the bus system and the velocity of signal propagation on the channel. Thus, the bit rate cannot readily be increased by reducing the duration of the individual bits.

To nevertheless be able to transmit a relatively large data block, needed for the programming of a control unit, with sufficient speed via a communication interface actually provided for the connection to a CAN domain, DE 101 53 085 A1 proposes switching the communication interface for transmitting the data block temporarily to a different communication mode in which no bit-by-bit arbitration is carried out, and therefore a relatively high bit rate is possible. In so doing, though, the communication using the CAN protocols must be interrupted for a certain time. For example, if, because of an error, the operation of the bus system can no longer be initiated according to the CAN protocols, a failure of the bus system then occurs. In addition, due to the transmission of a relatively large data block, the subsequent transmissions to be carried out according to the protocols of the CAN are delayed considerably, so that the real-time properties of the CAN are impaired. A use of this method not only for programming the control unit at the end of a manufacturing process of a motor vehicle or of the control unit, but also during the operation of the motor vehicle, is therefore not practical.

SUMMARY OF THE INVENTION

Therefore, an object of the exemplary embodiment and/or exemplary method of the present invention is to indicate a method for controlling access by one user station of a bus system to a channel utilized jointly by a plurality of user stations, in which great volumes of data are able to be transmitted relatively quickly, and real-time conditions are able to be honored during the transmission of messages via the bus. This objective is achieved by a media access control method having the features described herein.

In realizing the method of the present invention, the bit-by-bit arbitration, by which a bit rate of the first channel is limited, may be used for controlling access to the first channel, for example, whereas no separate arbitration is necessary for the second channel. One user station has exclusive access to the first channel within the enable interval, and accesses the second channel only when it has exclusive access to the first channel. Therefore, the second channel may have a considerably higher bit rate than the first channel. The user station is able to transmit a relatively large data block via the second channel while it has exclusive access to the first channel. The bus system may have a CAN domain.

It may be especially provided that a time window or a part of the time window within a regularly repeating time-window structure is predefined as the at least one enable interval. For the case when the bus system has a CAN domain, the enable interval, i.e., the time window, may be defined with the aid of the TTCAN protocols. In this context, the time window may be a section of a basic cycle repeating several times within one overall cycle. Since in the case of a TTCAN, a time window is usually assigned to a specific type of message, often a plurality of time windows, and therefore a plurality of enable intervals within the time-window structure is specified for a single user station. In particular, this is the case when this user station is responsible for the sending of messages of different message types, that is, forms an information source for several types of messages. Due to the use of the TTCAN, not only is a trouble-free communication between several user stations via the second channel able to be ensured without a separate arbitration process for the second channel being necessary for that purpose, but a certain portion of the capacity of the second channel may also be assigned to individual user stations. Therefore, a specific average bit rate may thereby be predefined or ensured for transmissions between two specific user stations or for transmissions of messages of certain message types.

Alternatively or additionally, a beginning of the enable interval may be ascertained by the user station by the bit-by-bit arbitration of the first channel, and an end of the enable interval may be specified as soon as the user station, after successful arbitration of the first channel, enables it again. In this manner, the access to the second channel is controlled by the bit-by-bit arbitration provided for the first channel. In the case of a CAN domain, the beginning of the enable interval may correspond to the end of the transmission of an arbitration field of a frame, and the end of the enable interval may correspond to an end of the transmission of a checksum field of this frame (CRC [cyclic redundancy check] field).

In one specific embodiment of the present invention, first data to be transmitted via the first channel and second data to be transmitted via the second channel are transmitted via one signal line in common. Thus, it is sufficient to provide a single signal line, e.g., in the form of a shared bus line, between the individual user stations. It is conceivable that it is a bus line of a known bus system, especially of the CAN, via which data of the first channel are transmitted according to the CAN protocols. This has the advantage that conventional user stations which, for example, handle the known protocols of the CAN, may easily be linked to the bus system, which is operated using the method of the present invention. In this respect, the proposed method is an extension of the CAN protocols, which is compatible with the known CAN protocols and devices.

In this context, a data signal is formed as a function of the first data, and a signal is formed which is modulated with the second data, and the data signal is superposed with the modulated signal. As a result of this, the transmission of the first data via the second channel is not disturbed by the transmission of the second data via the second channel proceeding simultaneously. For example, a frequency modulation, particularly a frequency shift keying as a function of a logic state (0 or 1) of the second channel may be used as modulation method for forming the modulated signal. It is also conceivable to provide a phase modulation, e.g., a binary phase modulation (Binary Phase Shift Keying, BPSK).

Alternatively, the first data of the first channel may be transmitted via a first signal line, and the data of the second channel may be transmitted via a second signal line separate from the first signal line. The first signal line may be a bus line in accordance with the specification of the CAN, whereas the second signal line may be constructed in any way desired. For instance, it may be a further CAN bus line, which is operated with a relatively high bit rate, however. Any desired physical transmission devices may be employed. It is also conceivable to use transceiver circuits and signal lines provided for local area networks, especially for the Ethernet.

A high bit rate of the second channel may thereby be realized. Since access to the second channel is controlled by the method of the present invention, collisions which occur during transmissions via non-switched computer networks and which are disadvantageous for real-time applications are avoided. In addition, the second signal line may also be formed by an electrical system of the motor vehicle if a data-transmission device for transmitting data via the electrical system of the motor vehicle (what is referred to as Power Line Communication, PLC) is provided in the user station.

As a further solution for the objective indicated above, a user station of a bus system, having the features delineated in Claim 7, is provided. With such a user station, it is ensured during operation of the bus system that no destruction of the data, to be transmitted via the second channel, occurs as a result of collisions on the second channel. The reason is that each user station linked to the bus system ensures that no more than one user station is accessing the second channel at any time. For instance, the user station may be an electronic component of a motor vehicle, especially a control device of a motor vehicle.

The user station may have a second control element for controlling access to the second channel. The second control element may be a communications controller of any type which does not have to carry out a protocol to control the access to the second channel. The communications controller may be realized simply as a controller for transmitting and receiving an asynchronous, serial data stream.

To permit coordination of the access to the second channel without using a separate media access control method or protocol, the second control element may be coupled to the first control element in such a way that the second control element is controllable, which may be with the aid of an access control signal generated by the first control element, for enabling the access to the second channel. In this context, the first control element may have an output for outputting the access control signal, and the second control element may have a corresponding control input, which is connected to the output.

Furthermore, the user station may have a coupling element, with which the two control elements are connectable to one shared signal line in such a way that the first data and the second data are transmittable via the shared signal line between different user stations. A simple line routing between the user stations of the bus system thereby becomes possible.

Alternatively, however, the user station may have a first transceiver circuit for connecting the user station to a first signal line, and a second transceiver circuit for connecting the user station to a second signal line separate from the first signal line. In this manner, comparatively high bit rates may be realized on the second channel with relatively low expenditure, especially with inexpensive user stations.

The user station may be equipped to carry out the method of the present invention, so that it realizes its advantages.

As yet another solution for the objective indicated above, a control element having the features delineated in Claim 13 is provided. The control element may be a CAN controller.

Compared to known control elements or CAN controllers, the control element, i.e., the CAN controller may be expanded in such a way that the control element or CAN controller is set up to generate an access control signal that indicates whether the second channel is enabled by the control element for access by the user station. In particular, the control element or CAN controller may have an output to output the access control signal.

In order to put the advantages of the method according to the present invention into effect, the control element or the CAN controller may be equipped to execute the method of the present invention.

The control element, i.e., the CAN controller, may be realized with the aid of at least one integrated circuit. For example, the integrated circuit may be an application-specific integrated circuit (ASIC) or a suitably programmed logic circuit (programmable logic device, PLD).

Further features and advantages of the present invention are derived from the following description, in which exemplary specific embodiments of the present invention are described in greater detail with reference to the drawings.

DETAILED DESCRIPTION

Figure 1:
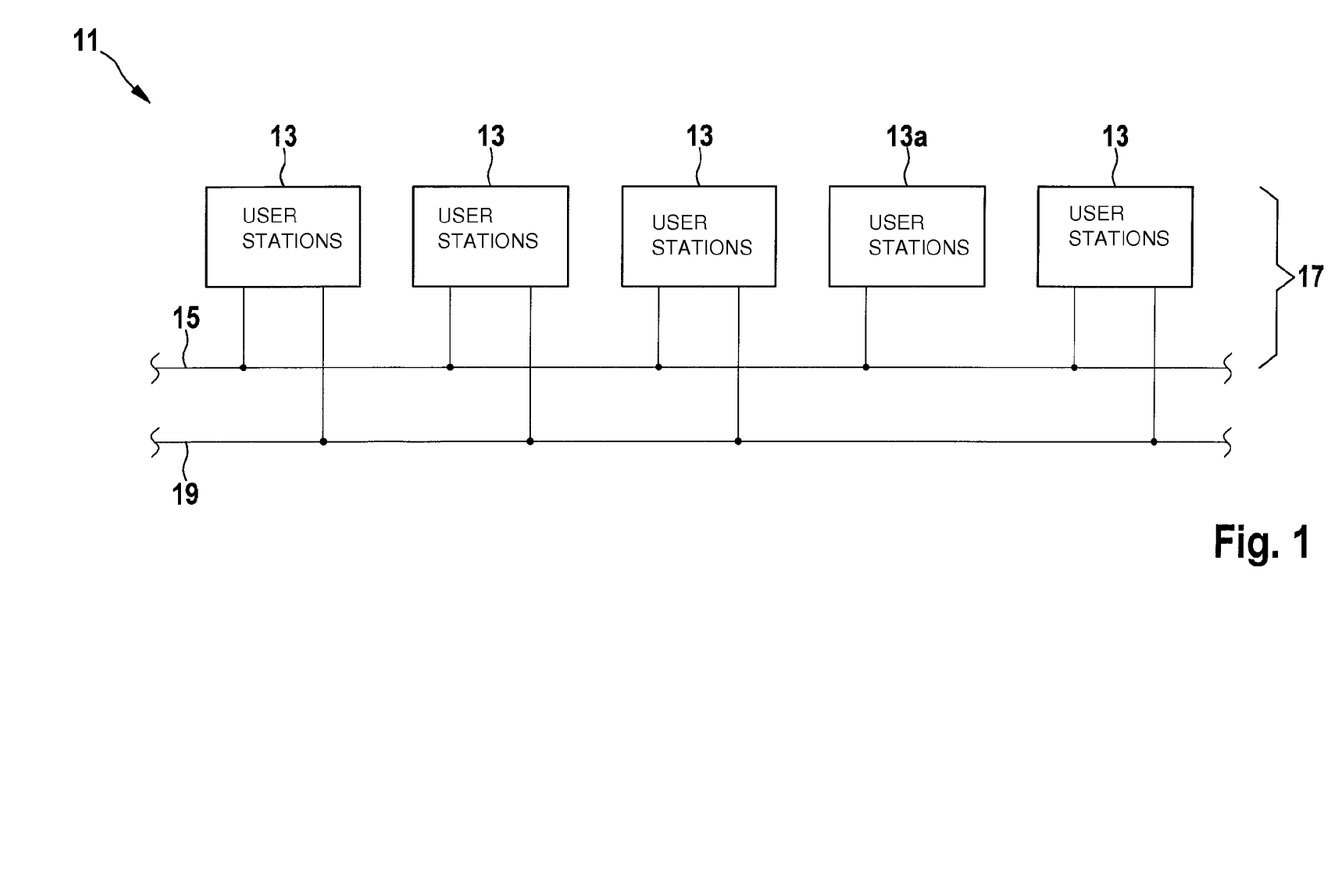
FIG. 1 shows a schematic representation of a bus system having a plurality of user stations.

FIG. 1 shows an overall view of a bus system 11 of a motor vehicle, that includes a plurality of user stations 13, 13a and a first channel 15 utilized jointly by these user stations 13, 13a. In the exemplary embodiments shown, user stations 13, 13a and first channel 15 form a CAN domain 17. However, the present invention may be applied not only to a CAN, but also to other types of communication networks in which an exclusive, collision-free access by one station to a shared channel is ensured at least for certain time spans. For example, user stations 13, 13a may be control devices or display devices of the motor vehicle.

A portion of user stations 13 is connected to a second channel 19 used jointly by this portion of user stations 13. In the exemplary embodiment shown, all user stations 13 are connected to both channels 15, 19, except for user station 13a. This user station 13a is a conventional user station 13a which, although it handles the CAN protocols, is not set up to carry out a method of the present invention. According to the invention, the other user stations 13 are expanded by additional functions, so that they additionally are able to communicate via second channel 19. Therefore, in the case of bus system 11 shown in FIG. 1, conventional user stations 13a and expanded user stations 13 are able to be connected to each other. A plurality of conventional user stations 13a may be provided in the bus system, as well; however, it is also conceivable to provide only expanded user stations 13 in bus system 11, which are connected to both channels 15, 19.

Figure 2:
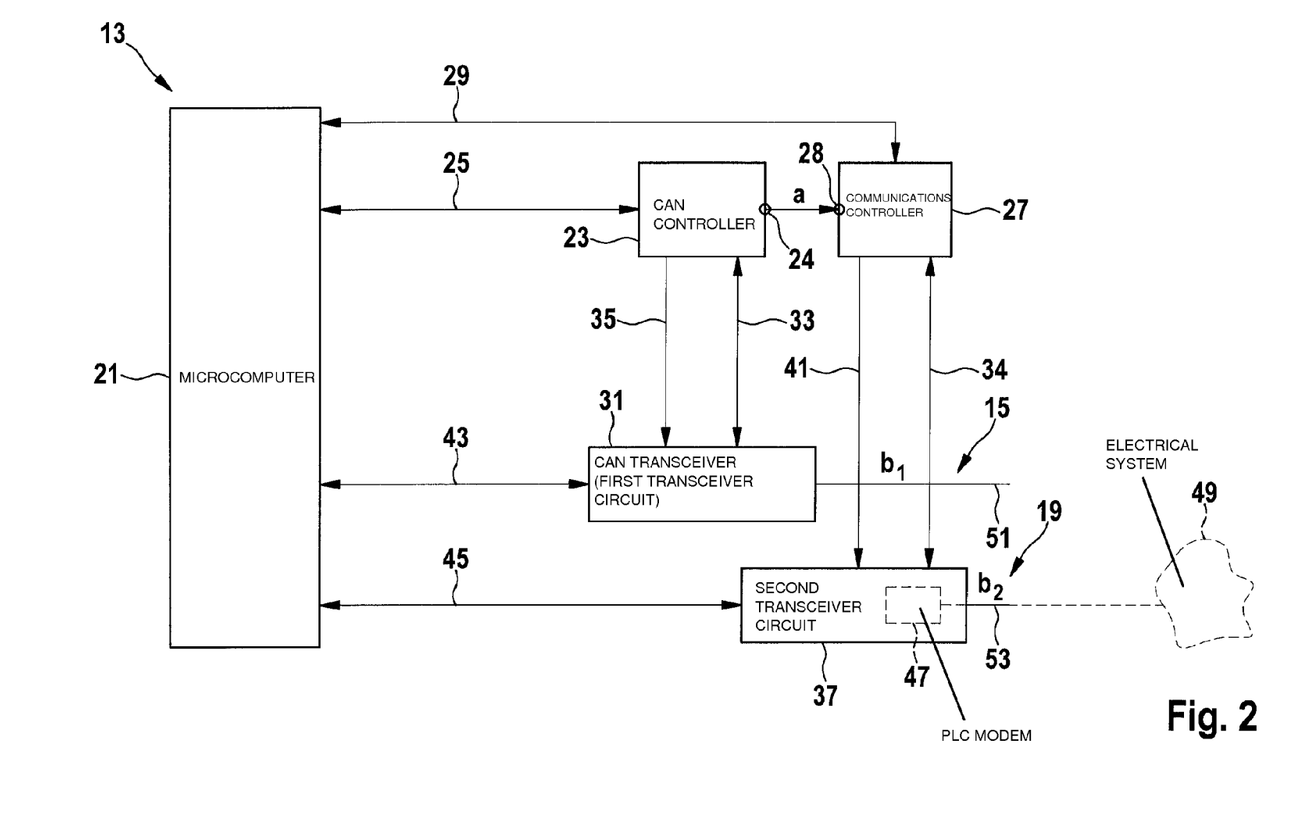
FIG. 2 shows a schematic representation of one of the user stations from FIG. 1 according to a first specific embodiment of the present invention.

FIG. 2 shows an expanded user station 13 in detail. This user station 13 has a microcomputer 21, which, for example, may take the form of a microcontroller. A first control element of the user station in the form of a CAN controller 23 is connected to microcomputer 21 via a first coupling device 25. In addition, user station 13 has a second control element in the form of a communications controller 27 which is connected to microcomputer 21 via a second coupling device 29. The two coupling devices 25, 29 are furnished for the exchange of data, as well as configuration, control and status information, to be transmitted via bus system 11 between microcomputer 21 and the two control elements 23, 27. Communications controller 27 is coupled to CAN controller 23 in such a way that the CAN controller, with the aid of an access control signal a generated by it, is able to control communications controller 27. To that end, a control input 28 of communications controller 27 is connected to a control output 24 of CAN controller 23.

Furthermore, user station 13 has a first transceiver circuit in the form of a CAN transceiver 31. CAN transceiver 31 is connected to CAN controller 23 in such a way that first data to be transmitted via CAN domain 17, i.e., via first channel 15, may be exchanged between CAN controller 23 and CAN transceiver 31 (arrow 33). In addition, CAN transceiver 31 is linked to CAN controller 23 in such a way that CAN controller 23 is able to transmit control signals to the CAN transceiver (arrow 35). CAN transceiver 31 is connected to first channel 15.

In addition, user station 13 has a second transceiver circuit 37 which is linked to communications controller 27 for transmitting first data to be exchanged via CAN domain 17 (arrow 39), as well as for transmitting control signals (arrow 41) between communications controller 27 and second transceiver circuit 37. Second transceiver circuit 37 is connected to second channel 19.

Moreover, both transceiver circuits 31, 37 are linked to microcomputer 21, so that microcomputer 21 is able to control both transceiver circuits 31, 37, and may read out status information from both transceiver circuits 31, 37 (see arrows 43 and 45). However, such a connection of microcomputer 21 to transceiver circuits 31, 37 is optional; the invention may also be realized without such a connection.

High degrees of freedom exist for the exact form of communications controller 27 and second transceiver circuit 37. It is merely necessary that communications controller 27 and second transceiver circuit 37 make available a transmission device for transmitting second data between expanded user stations 13. A protocol for controlling the media access to the second channel (Media Access Control Protocol, MAC protocol) does not have to be carried out via second channel 19. In the specific embodiment shown, communications controller 27 is set up to transmit and receive an asynchronous, serial data stream. For instance, a transceiver circuit which is actually provided for a CAN may be used as second transceiver circuit 37. Since no media access method must be carried out via second channel 19, and therefore no bit-by-bit arbitration of the CAN either, second transceiver circuit 37 may be operated with a bit rate which is higher than the bit rate permissible for the operation of the second transceiver circuit according to the protocols of the CAN. If both transceiver circuits 31, 37 are constructed in the same way as CAN transceivers, then second channel 19 may be operated with a higher bit rate than first channel 15. For example, the bit rate of second channel 19 may be 3 to 4 Mbit/s.

If the intention is to provide an even higher bit rate for data transmissions via second channel 19, then, for instance, a transceiver circuit for the communication system "FlexRay" or for local area networks such as the "Ethernet" may be used as second transceiver circuit 37. In this manner, for example, a bit rate of 10 Mbit/s or 100 Mbit/s may be realized on second channel 19. Second channel 19 may take the form of an electrical and/or an optical connection between second transceiver circuits 37 of user stations 13.

Moreover, the second channel may also be formed by an electrical system 49 of a motor vehicle, in which bus system 11 is installed (Power Line Communication, PLC). In this case, second transceiver circuit 37 has a PLC modem 47, which is coupled to electrical system 49 of the motor vehicle in order to transmit the second data via electrical system 49.

In the exemplary embodiment shown in FIG. 2, first channel 15 is formed by a first signal line 51. Second channel 19 is formed by a second signal line 53 separate from first signal line 51. For example, first signal line 51 is a two-wire line, customary for a CAN, for the differential transmission of the first data to be transmitted via first channel 15 (represented in FIG. 2 as first bit stream $b_1$). Second signal line 53 is set up for the transmission of data to be transmitted via second channel 19, i.e., for the transmission of a second bit stream $b_2$. Second signal line 53 may be formed as a further two-wire line for the differential transmission of second data $b_2$, i.e., second bit stream $b_2$, or may take a different form.

Figure 3:
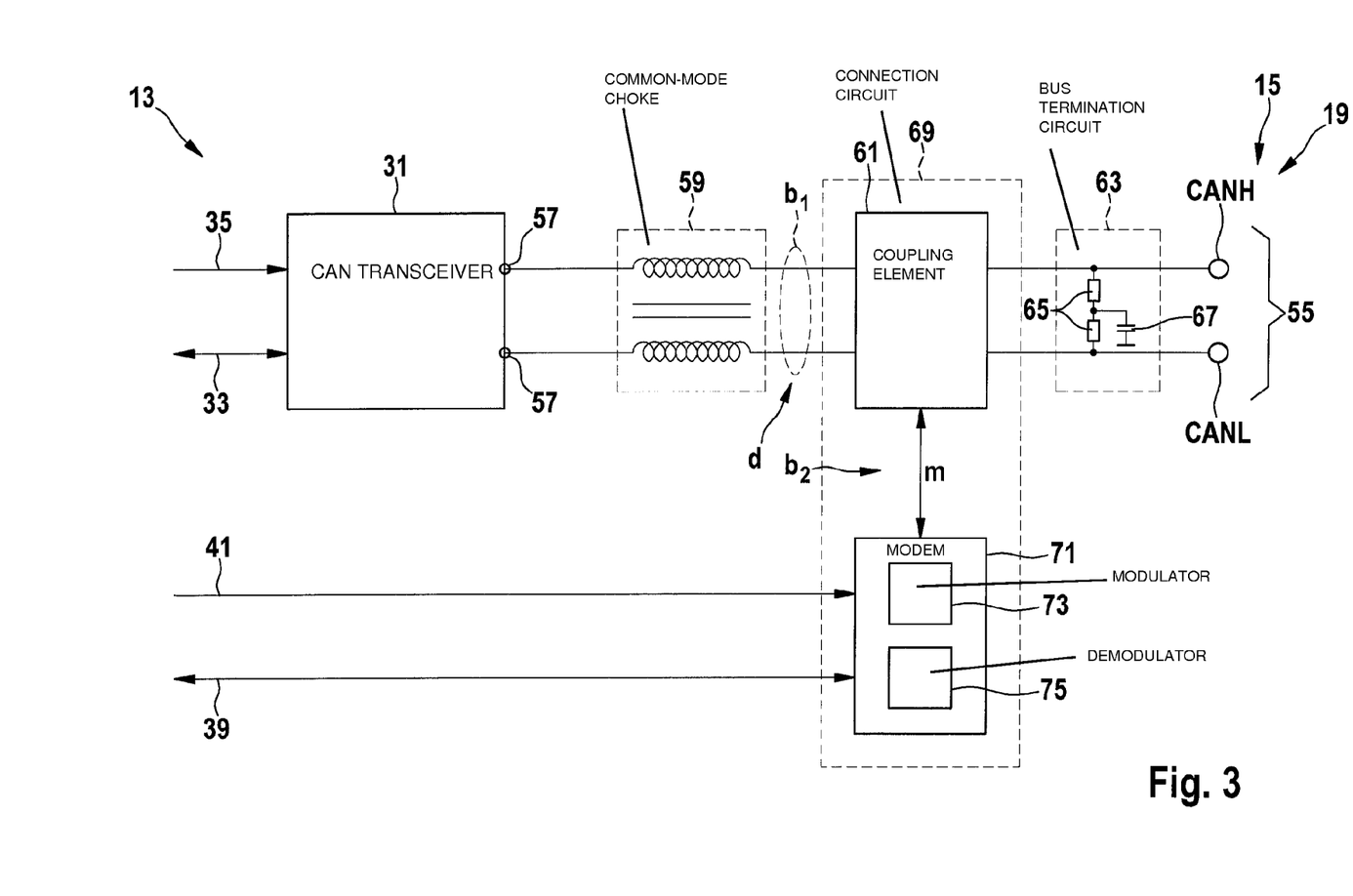
FIG. 3 shows a schematic representation of a part of a user station according to a second specific embodiment of the present invention.

FIG. 3 shows a specific embodiment in which one signal line 55 in common is provided for both channels 15, 19. Common signal line 55 includes a conductor pair, made up of a first conductor CANH and a second conductor CANL. In the specific embodiment shown, common signal line 55 is a conventional bus line suitable for a bus system based on a CAN.

As evident from FIG. 3, CAN transceiver 31 is also present in a user station 13 which is designed for connection to common signal line 55. A common-mode choke 59 is positioned at two bus interfaces 57 of CAN transceiver 31. A coupling element 61 is situated between common-mode choke 59 and conductor pair CANH, CANL of common signal line 55. In addition, situated between first conductor CANH and second conductor CANL is a bus termination circuit 63 which has two terminating resistors 65 connected in series, the outer ends of this series connection being connected to conductors CANH, CANL, and a center tap of this series connection being connected via a capacitor 67 to ground. In a specific embodiment not shown, common-mode choke 59 and/or bus termination circuit 63 is/are not provided.

Coupling element 61 belongs to a connection circuit 69 of user station 13, which in the specific embodiment shown in FIG. 3, is provided in place of second transceiver circuit 37. A modem 71 of connection circuit 69 is connected on one hand to microcomputer 21, and on the other hand, to coupling element 61. Modem 71 has a modulator 73 for generating a signal m modulated as a function of second bit stream $b_2$. Modem 71 also has a demodulator 75 for demodulating modulated signal m transmitted by another user station 13 via common signal line 55.

Figure 4:
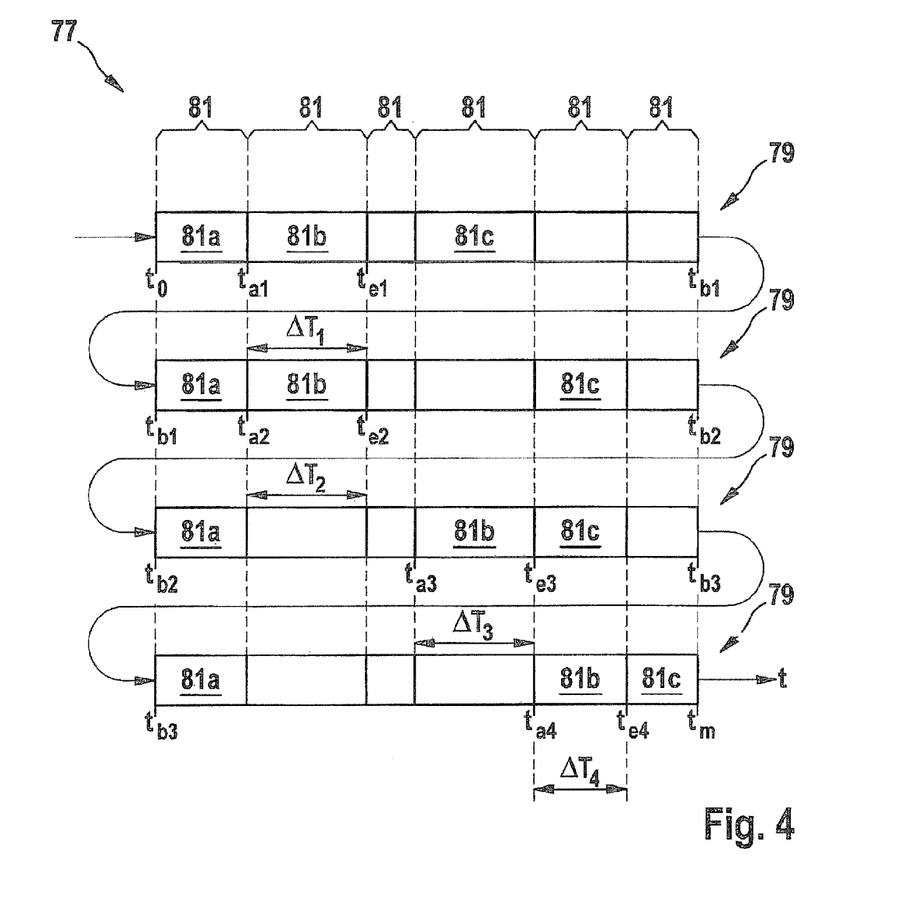
FIG. 4 shows a temporal course of an occupancy of a channel of the bus system.

In the following, the functioning method of user stations 13 and bus system 11 is described in greater detail with reference to FIGS. 4 and 5. During operation of bus system 11, microcomputers 21 of individual user stations 13 control individual CAN controllers 23 and CAN transceivers 31 so that messages are able to be exchanged between user stations 13, 13a according to the CAN protocols, by transmitting frames which contain the messages via first channel 15.

In the specific embodiment shown, individual user stations 13 support the TTCAN extension. According to the TTCAN, the time is subdivided into regularly repeating overall cycles. Such an overall cycle 77 is shown schematically in FIG. 4. Overall cycle 77 begins at instant $t_0$ and ends at instant $t_m$. One can see that, in turn, overall cycle 77 is subdivided into a plurality of basic cycles 79. In the specific embodiment shown, overall cycle 77 is subdivided into four basic cycles 79. First basic cycle 79 (drawn in at the top in FIG. 4) begins at instant $t_0$ and ends at an instant $t_{b1}$. Second basic cycle 79 following first basic cycle 79 also begins at this instant $t_{b1}$, and ends at an instant $t_{b2}$. Correspondingly, the third basic cycle begins at instant $t_{b2}$ and ends at an instant $t_{b3}$. The fourth basic cycle begins at instant $t_{b3}$ and ends at instant $t_m$, and thus completes overall cycle 77.

Individual basic cycles 79 are subdivided into a plurality of time windows 81—six time windows 81 in the specific embodiment shown; the subdivision of basic cycles 79 into time windows 81 is identical for each basic cycle 79. Overall cycles 77 define a regularly repeating time-window structure which, because of the identical subdivision of individual basic cycles 79 into time windows 81, has a matrix-like structure, and is therefore usually referred to as a communications matrix.

A first time window 81a is provided for transmitting reference messages via first channel 15. The reference messages are used in particular to synchronize individual user stations 13 with each other, so that from the point of view of individual user stations 13, the temporal position of individual time windows 81 is at least essentially identical. A portion of time windows 81 is assigned to one specific type of message, that is, within these time windows 81, data frames having a specific identifier are transmitted exclusively. For example, it may be provided that time windows 81 denoted 81b are reserved for transmitting the message of the specific type. Since when working with a CAN, a message of one specific type, that is, having a specific identifier, may be generated only by one user station 13, time windows 81b are assigned exclusively to this user station 13. That is to say, at a starting instant $t_{a1}$, $t_{a2}$, $t_{a3}$ or $t_{a4}$, an enable interval $\Delta T_1$, $\Delta T_2$, $\Delta T_3$ or $\Delta T_4$ begins, within which this user station 13 has exclusive access to first channel 15. Enable interval $\Delta T_1$, $\Delta T_2$, $\Delta T_3$ or $\Delta T_4$ in each case ends at the end of associated time window 81b, i.e., at instant t $t_{e1}$, $t_{e2}$, $t_{e3}$ or $t_{e4}$. In the specific embodiment shown, enable interval $\Delta T_1$, $\Delta T_2$, $\Delta T_3$ or $\Delta T_4$ corresponds to respective time window 81b of the overall cycle. Deviating from that, however, enable interval $\Delta T_1$, $\Delta T_2$, $\Delta T_3$ or $\Delta T_4$ may also correspond merely to a part of respective time window 81b. It is essential for the functioning of the method according to the present invention that, in respect to time, enable interval $\Delta T_1$, $\Delta T_2$, $\Delta T_3$ or $\Delta T_4$ is covered completely by one time window 81b or by a plurality of time windows 81b directly following one another.

Each user station 13 detects instants $t_0$, $t_{b1}$, $t_{b2}$, $t_{b3}$ at which the individual reference messages are received and calculates the temporal position of at least those time windows 81, within which it would like to access the bus. User station 13 which is responsible for sending the messages to which time window 81b is assigned, calculates the position of enable interval $\Delta T_1$, $\Delta T_2$, $\Delta T_3$ or $\Delta T_4$ marked in in FIG. 4. In the specific embodiment shown, CAN controller 23 performs these calculations. However, it may also be provided for microcomputer 21 to carry out these calculations. Furthermore, CAN controller 23 generates access control signal a and sends it to communications controller 27 (see FIG. 2). Access control signal a is always active within enable interval $\Delta T_1$, $\Delta T_2$, $\Delta T_3$ or $\Delta T_4$. Communications controller 27 evaluates access control signal a and accesses second channel 19 only when access control signal a is active. If access control signal a is not active, then communications controller 27 keeps second channel 19 free, so that other user stations 13 are able to access second channel 19. User stations 13 are thus set up so that CAN controller 23, as a function of the access control method executed in the CAN domain, controls communications controller 27 in such a way that communications controller 27 accesses second channel 19 only when access to first channel 15 is also allowed according to the media access control method of CAN domain 17.

Also provided within overall cycle 77 are further time windows 81c, within which messages of any type are allowed to be transmitted. Exclusive access by a specific station to the first channel is not guaranteed within these time windows

81c. Therefore, a bit-by-bit arbitration is carried out according to the CAN protocols within time windows 81c. The basis of the bit-by-bit arbitration is that, for the case when a plurality of user stations 13 access first channel 15 simultaneously and transmit bits having different values, one bit having a specific value is always received by all stations. The value of this bit is referred to as "dominant bit" and corresponds to the value 0 in the example shown. Furthermore, first signal line 51 is set up so that each user station 13 is able to receive via its CAN transceiver 31 while it is accessing first channel 15. Therefore, each user station 13, while it is accessing first channel 15 in order to transmit a bit, is able to read the instantaneous state of first channel 15, in order to determine whether this state corresponds to the transmitted bit.

Figure 5:
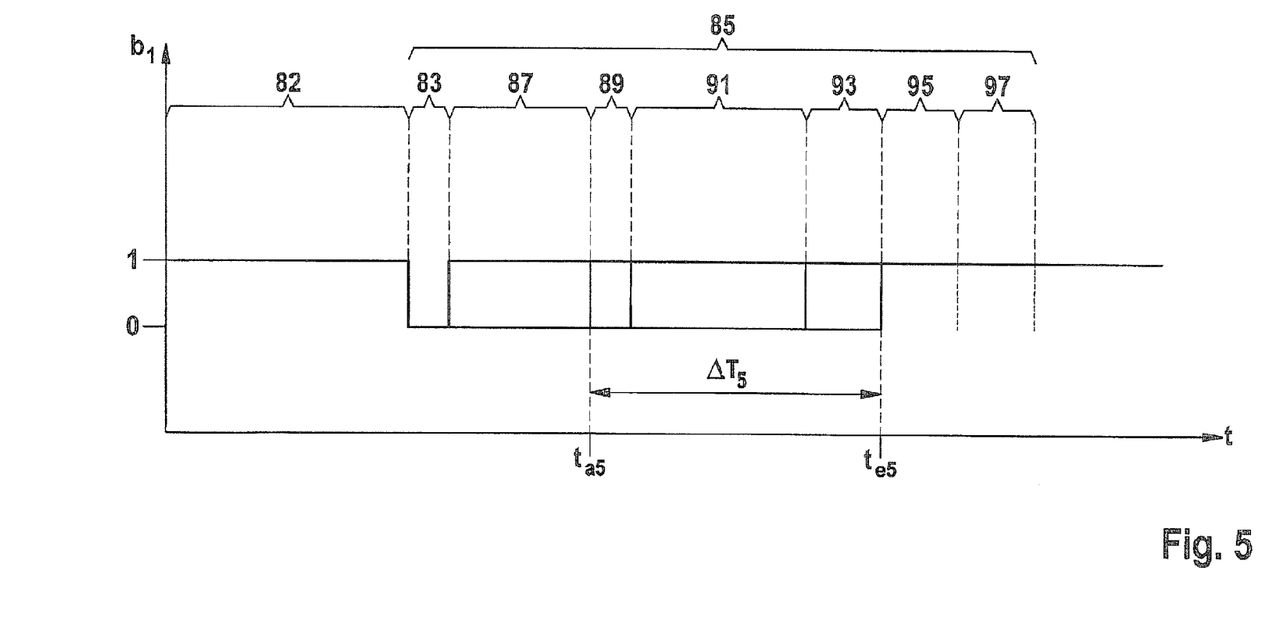
FIG. 5 shows a temporal course of the channel occupancy during the transmission of one frame via the channel.

FIG. 5 shows a section of a temporal course of the logic state (value 0 or 1) of first channel 15 within time window 81c. After an idle time 82 in which first channel 15 was not occupied by any user station 13, a contemplated user station 13 begins to transmit a start bit 83 of a frame 85. After transmitting start bit 83, user station 13 transmits an arbitration field 87 which, in particular, includes the identifier of the message that indicates the type of message. During the transmission of arbitration field 87, user station 13 compares the logic state of first channel 15 to the respective transmitted bit of arbitration field 87. If, during the transmission of arbitration field 87, user station 13 determines that the ascertained state of the first channel does not correspond to the transmitted bit, then user station 13 aborts the transmission of frame 85. Thus, it is ensured that after the transmission of arbitration field 87, at an instant $t_{a5}$, one user station 13 has exclusive access to first channel 15. All other stations which have accessed first channel 15 at the same time in order to transmit a frame 85 have aborted their transmission, and therefore their access to first channel 15, at instant $t_{a5}$. Therefore, instant $t_{a5}$ corresponds to the beginning of a further enable interval $\Delta T_5$. After transmitting arbitration field 87, user station 13 transmits a control field 89 of frame 85, a data field 91 of frame 85 as well as a check field 93 (referred to as the CRC field).

In an acknowledgment field 95 following check field 93, other user stations 13 are able to transmit an acknowledgment bit via first channel 15, that is, are able to access first channel 15. Therefore, enable interval $\Delta T_5$, within which contemplated user station 13 has exclusive access to first channel 15, ends at the end of the transmission of check field 93, that is, at an instant $t_{e5}$. Following acknowledgment field 95 is a field having stop bits 97. Deviating from the specific embodiment shown, the enable interval may also be selected to be shorter; however, it must lie within interval $\Delta T_5$ in which user station 13 has exclusive access to first channel 15.

During time windows 81c, CAN controller 23 ensures that access control signal a is active only during enable interval $\Delta T_5$, so that within time windows 81c, communications controller 27 accesses second channel 19 only during enable interval $\Delta T_5$.

Differing from the specific embodiment shown, CAN controller 23 may also generate enable signal a to enable access to second channel 19 only within those time windows 81 which are provided for transmitting messages of a specific type, that is, for example, within time windows 81b. During those time windows (e.g., time windows 81c), which are used to transmit messages of different types, that is, within which the bit-by-bit arbitration takes place, second channel 19 is not used in this specific embodiment. It is also conceivable that access to the second channel during interval $\Delta T_5$ is enabled only when the TTCAN is not available, e.g., because of a fault in CAN domain 17. An emergency operation of bus system 11, especially of second channel 19, is thereby made possible when the TTCAN is not available, i.e., in response to a missing time-window structure 77.

It may further be provided to apply the exemplary embodiment and/or exemplary method of the present invention to a CAN domain 17 which does not support the TTCAN extension. Time-window structure 77 is missing in such a CAN domain 17. Therefore, a bit-by-bit arbitration continually takes place in that case. In such a CAN domain 17, access to second channel 19 is enabled during enable interval $\Delta T_5$ marked in in FIG. 5.

If access control signal a is active, that is, access to second channel 19 is enabled, then in the case of the specific embodiment shown in FIG. 2, second transceiver circuit 37 outputs second bit stream $b_2$. If second signal line 53 is formed by electrical system 49, then in the case of transmitting user station 13, PLC modem 47 modulates bit stream $b_2$ and supplies a suitably modulated signal to electrical system 49. In the case of receiving user stations 13, PLC modem 47 demodulates the modulated signal supplied by transmitting user station 13, and thereby reconstructs transmitted bit stream $b_2$ and relays the second data contained in second bit stream $b_2$ to communications controller 27.

In the case of the specific embodiment shown in FIG. 3, modulator 73 of modem 71 of transmitting user station 13 generates modulated signal m as a function of second data $b_2$, which communications controller 27 has transmitted to connection circuit 69. Coupling element 61 superposes a data signal d, generated by CAN transceiver 31 as a function of first bit stream $b_1$, with signal m modulated as a function of second bit stream $b_2$, and outputs it to the two conductors CANH and CANL of common signal line 55. In receiving user stations 13, coupling element 61 relays a signal, received via the two conductors CANH and CANL, to CAN transceiver 31, optionally via common-mode choke 59, and supplies it to demodulator 75 of modem 71. From the received signal, CAN transceiver 31 extracts first bit stream $b_2$ and passes it on to CAN controller 23. In corresponding manner, demodulator 75 ascertains second bit stream $b_2$ from the received signal. Because optionally provided common-mode choke 59 is disposed between CAN transceiver 31 and coupling element 61, common-mode choke 59 is prevented from attenuating modulated signal m within a signal path between modems 71 of two user stations 13 connected to common signal line 55.

In the specific embodiment shown, as a modulation method, modem 71 uses a frequency shift keying as a function of the value of the individual, temporally successive bits of second bit stream $b_2$. Deviating from that, in place of the frequency shift keying, a phase modulation or any other modulation method may be used, as well.

In the simplest case, coupling element 61 may take the form of a resistor network. However, it may also be provided that coupling element 61 have one or more filters for separating data signal d to be supplied to CAN transceiver 31, from modulated signal m. Furthermore, it would be conceivable for coupling element 61 to be combined with common-mode choke 59; thus, instead of a simple inductor having four terminals, an inductor having six or more terminals is used for common-mode choke 59. In this manner, the HF-signal may be coupled in or out inductively, and the HF-portion is decoupled galvanically from the CAN bus. In addition, cost advantages are obtained in this manner.

Overall, therefore, the exemplary embodiment and/or exemplary method of the present invention provides a method and a user station 13 which make it possible to increase the payload rate of CAN domain 17 considerably with the aid of additional second channel 19, so that larger data blocks are able to be transmitted easily over bus system 11. Since access to second channel 19 is controlled as a function of the media access control of CAN domain 17, collisions, i.e., disturbances as the result of unintentional access by several user stations 13 to second channel 19 at the same time, are able to be avoided. Therefore, a bus system 11 is obtained which is able to honor the real-time conditions occurring in automotive engineering, permits transmissions with relatively high bit rates, and nevertheless, may be realized inexpensively.

What is claimed is:

1. A media access control method for controlling access by a first user station of a bus system to a first channel and a second channel of the bus system utilized jointly by a plurality of user stations, the method comprising:
    determining, by first processing circuitry of the first user station and in accordance with a predefined protocol, whether an enable interval has commenced, wherein:
        (I)
            (a) the enable interval is predefined as a time window or a part of the time window within a regularly repeating time-window structure and the commencement of the enable interval is identified by the predefinition, or
            (b) the commencement of the enable interval is identified with the aid of bit-by-bit arbitration of the first channel; and
        (II) during the enable interval, only the first user station is enabled to transmit on the first and second channels;
    transmitting, by the first processing circuitry, an access control signal to second processing circuitry of the first user station during the enable interval to enable access to the second channel;
    while receiving the access control signal at the second processing circuitry, conditionally transmitting, by the second processing circuitry, first data on the second channel during the enable interval.

2. The method of claim 1, wherein enable interval is predefined as the time window or the part of the time window within the regularly repeating time-window structure.

3. The method of claim 1, wherein the commencement of the enable interval is ascertained by the user station with the aid of the bit-by-bit arbitration of the first channel, and an end of the enable interval is specified as soon as the user station, after successful arbitration of the first channel, releases the first channel for joint utilization by the plurality of user stations again.

4. The method of claim 1, further comprising transmitting, by the first processing circuitry, second data on the first channel during the enable interval, wherein first data to be transmitted via the second channel and second data to be transmitted via the first channel are transmitted via one signal line in common.

5. The method of claim 4, wherein a data signal is formed as a function of the second data, and a signal is formed that is modulated with the first data, and the data signal is superposed with the modulated signal.

6. The method of claim 1, further comprising transmitting, by the first processing circuitry, second data on the first channel during the enable interval, wherein the first data are transmitted via a first signal line and the second data are transmitted via a second signal line separate from the first signal line.

7. The method of claim 1, wherein a complete set of the plurality of user stations coupled to the first channel is different than a complete set of the plurality of user stations coupled to the second channel.

8. The method of claim 7, wherein the complete set of the plurality of user stations coupled to the second channel is a subset of the complete set of the plurality of user stations coupled to the first channel.

9. The method of claim 1, wherein the enabling of the first channel for the user station includes arbitrating between attempted access to the first channel by the user station and another of the plurality of user stations that are coupled to the first channel, and the controlling of the access by the user station to the second channel includes enabling the second channel for access by the user station in response to enabling the first channel for access by the user station as a result of the arbitration.

10. A first user station of a bus system, comprising:
    first processing circuitry; and
    second processing circuitry, wherein:
        the first processing circuitry is configured to control access by the first user station to a first channel and a second channel of the bus system utilized jointly by a plurality of user stations, the control including:
            (1) determining, by the first processing circuitry of the first user station and in accordance with a predefined protocol, whether an enable interval has commenced, wherein:
                (I)
                    (a) the enable interval is predefined as a time window or a part of the time window within a regularly repeating time-window structure and the commencement of the enable interval is identified by the predefinition, or
                    (b) the commencement of the enable interval is identified with the aid of bit-by-bit arbitration of the first channel; and
                (II) during the enable interval, only the first user station is enabled to transmit on the first and second channels;
            transmitting, by the first processing circuitry, an access control signal to the second processing circuitry of the first user station during the enable interval to enable access to the second channel; and
            (3) while receiving the access control signal at the second processing circuitry, conditionally transmitting, by the second processing circuitry, first data on the second channel during the enable interval.

11. The user station of claim 10, wherein the second processing circuitry performs a direct control of access to the second channel.

12. The user station of claim 11, wherein the second processing circuitry is coupled to the first processing circuitry so that the second processing circuitry is controllable, with the aid of the access control signal generated by the first processing circuitry, for enabling access to the second channel.

13. The user station of claim 11, wherein the user station has a coupling element with which the first and second processing circuitry are connectable to one common signal line so that first data to be transmitted via the second channel and second data to be transmitted via the first channel are transmittable via the common signal line between different user stations.

14. The user station of claim 10, wherein the user station has a first transceiver circuit for connecting the user station to a first signal line and a second transceiver circuit for connecting the user station to a second signal line separate from the first signal line.

15. The user station of claim 10, wherein the user station is equipped to perform the following:

enabling the first channel for the user station during at least one enable interval for exclusive access to the first channel; and controlling the access to a second channel utilized by a plurality of user stations so that the second channel is enabled only within the enable interval of the first channel for access by the user station.

16. The user station of claim 10, wherein the access control signal indicates whether the second channel is enabled for access by the user station.

17. The user station control element of claim 10, wherein the first processing circuitry is configured to implement a media access control method for the controlling of the access by the user station to the first channel by enabling the first channel for the user station during at least one enable interval for exclusive access to the first channel, access to the second channel by the user station being enabled only within the at least one enable interval of the first channel.

18. The user station of claim 10, wherein the first processing circuitry is configured to transmit second data in the first channel during the enable interval.

* * * * *